United States Patent [19]

Kobayashi

[11] Patent Number: 4,838,555
[45] Date of Patent: Jun. 13, 1989

[54] HEAD OF WOOD TYPE GOLF CLUB
[75] Inventor: Masashi Kobayashi, Matsudo, Japan
[73] Assignee: Maruman Golf Co., Ltd., Tokyo, Japan
[21] Appl. No.: 151,038
[22] Filed: Feb. 1, 1988
[30] Foreign Application Priority Data Feb. 2, 1987 [JP] Japan ................. 62-020518

[51] Int. Cl.⁴ .................................. A63B 53/04
[52] U.S. Cl. ..................... 273/167 A; 273/167 E
[58] Field of Search .......... 273/167 E, 167 A, 167 D, 273/80.5

[56] References Cited

U.S. PATENT DOCUMENTS

| D. 240,058 | 5/1976 | Bizovi | 273/167 A |
|---|---|---|---|
| 1,528,017 | 3/1925 | Gammeter | 273/167 E |
| 1,587,758 | 6/1926 | Charavay | 273/167 E |
| 3,595,577 | 7/1971 | Hodge | 273/167 E |
| 3,985,363 | 10/1976 | Jepson | 273/80.5 |

Primary Examiner—Edward M. Coven
Assistant Examiner—Benjamin Layno
Attorney, Agent, or Firm—Armstrong, Nikaido Marmelstein Kubovcik & Murray

[57] ABSTRACT

A head of a wood type golf club comprises a head body (11) formed integrally with a neck (12). The head body (11) has a club face (13) for hitting a golf ball, an upper surface (14) extending rearward in a convex curve from the upper edge of the club face (13), a sole surface (15) extending rearward on a substantially flat plane from the lower edge of the club face (13) and having a smaller area than the upper surface (14), and lateral surfaces (16) extending rearward between the upper and sole surfaces from the toe and heel edges of the club face (13). The lateral surfaces (16) are curved in substantially an S-shape from the peripheral edge of the upper surface (14) toward the peripheral edge of the sole surface (15), and the height from the sole surface (15) to the inflection point (S1) of the S-shaped profile line of the lateral surfaces (16) is increased from the toe and heel edges of the club face (13) toward the rear end of the head body (11).

3 Claims, 2 Drawing Sheets

HEAD OF WOOD TYPE GOLF CLUB

BACKGROUND OF THE INVENTION

1. Field of the Invention

The present invention relates to a head of a wood type golf club, and more particularly to a wood club head having an improved aerodynamic characteristic.

To ensure the greatest travel distance of a golf ball, the speed of the golf club head should be a high as at the moment of impact with the golf ball. To this end, the air resistance against the head of the golf club during a swing thereof must be minimized. This reduction of air resistance is realized by creating a turbulent boundary layer covering as wide a range as possible on the surface of a golf club head to reduce the vortex developed behind the golf club head. This is accomplished by giving the golf club head the optimum streamline shape.

2. Description of the Related Art

The head of a conventional wood type golf club is composed of a head body and a neck formed integrally with the head body. The head body has a club face slanted at a predetermined angle of loft, an upper surface extending rearward in a curve from the upper edge of the club face, a sole surface extending rearward and substantially flat from the lower edge of the club face, and lateral surfaces extending rearward between the upper and sole surfaces from the heel and toe ends of the club face. The neck is projected obliquely upward from the lateral side of the toe of the head body. Usually, the sole surface has a smaller area than that of the upper surface and the lateral surfaces between the upper and sole surfaces is curved slightly outward.

The sole surface of the head body must extend rearward on a substantially flat plane from the lower edge of the club face, and to give the head the optimum streamlined shape, the upper and lateral surfaces of the head body must be curved into a substantially streamlined profile. However, the lateral surface of the head body of the conventional clubs are curved slightly outward between the upper and sole surfaces, as described above, and thus the external profile line of the lateral surfaces is not streamlined when viewed in a vertical cross-section almost perpendicular to the club face extending across the lateral surfaces, and this causes an increase in the air resistance.

SUMMARY OF THE INVENTION

An object of the present invention is to provide a head of a wood type golf club by which air resistance to the head body can be minimized but the sole surface extending rearward from the lower edge of the club face of the head body remains substantially flat.

The above object can be attained by providing a head of a wood type golf club comprising, according to the present invention, a head body formed integrally with a neck, the head body having a club face for hitting a golf ball, an upper surface extending rearward in a curve from the upper edge of the club face, a sole surface extending rearward on a substantially flat plane from the lower edge of the club face and having a smaller area than that of the upper surface, and lateral surfaces extending rearward between the upper and sole surfaces from the toe and heel edges of the club face, the lateral surfaces being curved into substantially an S-shape from the peripheral edge of the upper surface toward the peripheral edge of the sole surface, and the height from the sole surface to the inflection point of the S-shaped profile line of the lateral surfaces being increased from the toe and heel edges of the club face toward the rear end of the head body.

As viewed in a vertical cross-section substantially perpendicular to the club face extending across the lateral surfaces of the head body of the head of wood type golf club according to the present invention, the outer profile line of the lateral surfaces near the peripheral edges of the upper surface is substantially streamlined, which decreases the air resistance against the club head, especially, at the lateral surfaces of the head body. Therefore, the air resistance against the head body can be reduced while the sole surface extending rearward from the lower front edge of the club face of the head body remains substantially on a flat plane in a direction, thus enabling impact between the golf club head and a golf ball to occur at an increased speed.

These and other objects and advantages of the present invention will be better understood from the ensuing description made, by way of example, of the embodiments according to the present invention with reference to the drawings.

DESCRIPTION OF THE PREFERRED EMBODIMENTS

Figure 2:
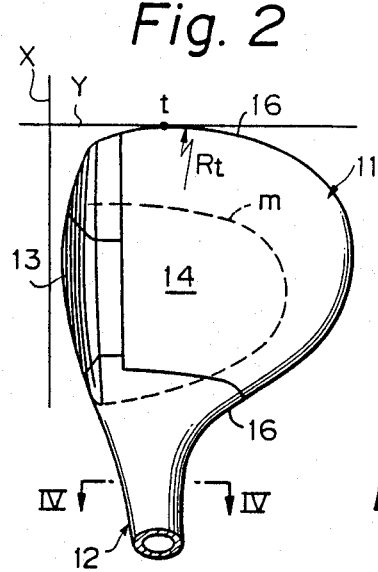
FIG. 2 is a plan view of the head in FIG. 1.
Figure 1:
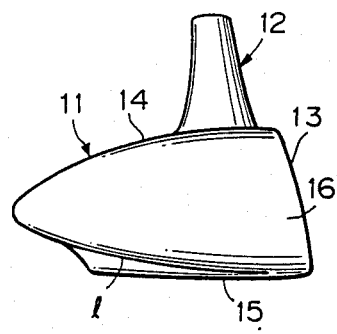
FIG. 1 is an elevational view of a head of an embodiment of a wood type golf club head according to the present invention, when viewed from the toe side of the head.

FIGS. 1 through 8 show one embodiment in which the present invention is applied to the head of a driver golf club. As seen in these figures, the head is composed of a head body 11 and a neck 12. The head body 11 has a club face 13 coming into contact with a golf ball, an upper surface 14 having a peripheral edge extending rearward in a convex curve from the upper edge of the club face 13 a sole surface 15 extending rearward on a substantially flat plane from the lower edge of the club face 13, and lateral surfaces 16 extending from the toe and heel edges of the club face 13 toward the upper and sole surfaces 14 and 15. The neck 12 extends obliquely upward from near the heel of the lateral surfaces 16 of the head body 11. The profile of the sole surface 15 is shown by a dotted line in FIG. 2, and by a solid line n in FIGS. 5 and 8. As seen from these figures, the sole surface 15 has a smaller area than that of the upper surface 14.

Figure 6:
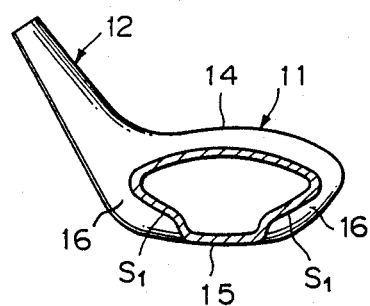
FIG. 6 is a sectional view of the head in FIG. 1, taken along the line VI—VI of FIG. 5.

According to the present invention, the lateral surfaces 16 extending from near the toe and heel edges of the club face 13 toward the rear end of the head body 11 are curved into substantially an S-shape from the peripheral edge of the upper surface 14 toward that of the sole surface 15 as shown in FIG. 6. In other words, the lateral surfaces 16 have inflection points $S_1$ which define upper convex portions of the lateral surfaces merging with the upper surface and lower concave portions of the lateral surfaces merging with the sole surface. The substantially S-shaped curve bends outward near the peripheral edge of the upper surface 14 and inward near the peripheral edge of the sole surface 15. Therefore, in a section taken substantially in the direction of thickness, the outer profile line of the lateral surfaces 16 is substantially an S-shaped curve having an inflection point S1 at mid point (as shown in FIG. 6). The inflection point of the substantially S-shaped profile line lies in the line shown in FIGS. 1, 5 and 7. The height from the sole surface 15 to the inflection point S1 of the substantially S-shaped profile line increases as from the toe and heel edges of the club face 13 toward the rear end of the head body 11, as seen from the inclination of the line in FIG. 1.

Figure 7:
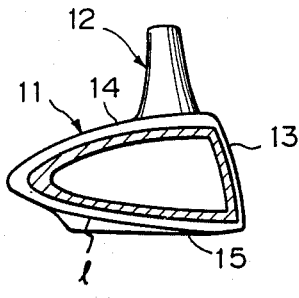
FIG. 7 is a sectional view of the head in FIG. 1, taken along the line VII—VII.

Therefore, as viewed in a vertical section substantially perpendicular to the club face 13 extending across the lateral surfaces 16 of the head body 11, the outer profile lines of the lateral surfaces 16 are substantially streamlined in the same way as the outer profile line of the upper surface 14 shown in FIG. 7. Especially near the peripheral edge of the upper surface 14, the outer profile lines of the lateral surfaces 16 and upper surface 14 are symmetrical with respect to the horizontal plane. Therefore, at the lateral surfaces 16 of the head body 11 an air turbulent boundary layer is formed during a swing of the golf club, over a wide range in a direction from the front to the rear. Since the separation point of the air flow from the lateral surfaces 16 is closer to the rear end of the head body 11 than in the conventional club head, a vortex is not easily created behind the head body 11, and thus the air resistance against the head is reduced.

Figure 4:
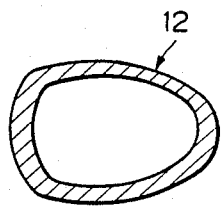
FIG. 4 is a sectional view, on an enlarged scale, of the neck of the head in FIG. 1, taken along the line IV—IV of FIG. 2.
Figure 5:
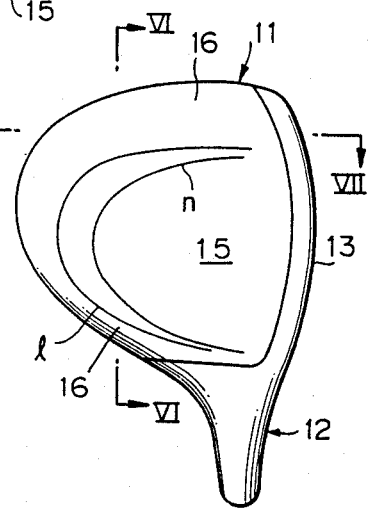
FIG. 5 is a bottom view of the head in FIG. 1.

Further, as shown in the illustrated embodiment, the sectional shape of the neck 12 of the head is substantially streamlined as shown in FIG. 4, and therefore the air resistance against the neck 12 during a swing of the club is also reduced.

The upper surface 14 and sole surface 15 of the head body 11 have a substantially D-shaped profile when viewed from above and below, respectively. In the illustrated embodiment as shown in FIG. 2, the radius of curvature Rt of the profile of the toe side of the upper surface 14 of the head body 11 is larger than that of the conventional head, namely, within a range of 45 mm $<$ Rt $<$ 86 mm (75 mm in the illustrated embodiment) at a region of about 20 mm around the contact point t between the plane Y perpendicular to a plane X parallel to the club face 13 and the toe side of the upper surface 14. Therefore, the upper surface 11 is longer from the front to the rear than that of the conventional club head, and the resulting profile of the upper surface 14 provides the head with a reduced air resistance.

Figure 3:
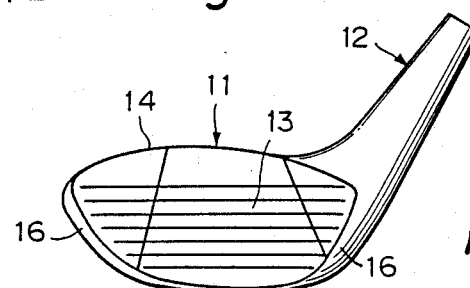
FIG. 3 is a front view of the head in FIG. 1.

Furthermore in the illustrated embodiment, the width of the sole surface 15 between the toe and heel is narrower than that of the conventional golf club, as shown in FIG. 3, to further reduce the air resistance against the head. Also, the head body 11 is not easily snagged by the ground (turf), during a swing, and thus the head can be swung more easily and impact with the golf ball can be made at an increased speed.

Figure 8:
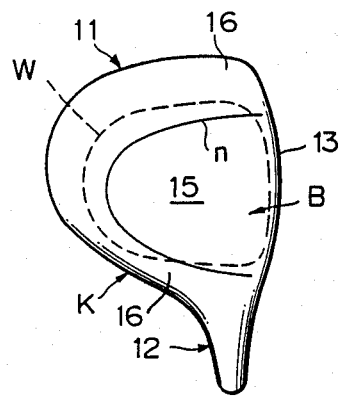
FIG. 8 is a bottom view showing welded portions of the head in FIG. 1.

The head of the wood type golf club of the above-mentioned construction is made of a metal and has a hollow structure, and is made by the lost wax process and welding. FIG. 8 shows the process of making the head body 11 formed integrally with the neck 12. The part K and the part B are formed separately, and then welded together along the dash line W. If the profile line n of the sole surface 15 coincides with the welding boundary line W, the shape at the profile line n of the sole surface 15 is easily deformed due to the welding. As seen from the figure, however, since the boundary line W between the parts K and B extends from the toe edge of the club face 13 toward the rear of the head body 11 inside the lateral surfaces 16, the profile line n of the sole surface 14 is not affected by the welding, and therefore, deformation of the profile line n of the sole surface 15 can be prevented.

Figure 9:
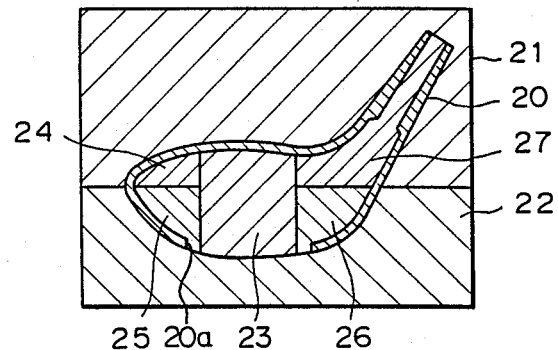
FIG. 9 is a sectional view showing the lost wax process for the head in FIG. 1.

When making the part K of the head body 11 formed integrally with the neck 12 by the lost wax process, the mold shown in FIG. 9 is used. In FIG. 9, 20 indicates a wax of a same shape as the part K, 21 and 22 indicate molds for the outer surfaces, and 23 to 27 indicate core molds for the inner surfaces. The wax 20 has a large opening 20a corresponding to the welding boundary line W, so that the core molds 23 to 27 can be easily removed after molding.

The head of the wood type golf club having the above-mentioned construction according to the present invention and the heads of conventional common wood type golf clubs were tested by measuring the air resistance there against at a head speed of 42 meters per sec. The air resistance against the heads of the conventional wood type golf clubs was 526 gf, and that against the wood club head according to the present invention was 321 gf, which proved that, during a swing, the head of the wood type golf club according to the present invention meets less air resistance.

Although the embodiment according to the present invention has been described and illustrated as above, the present invention can be similarly applied to the heads of wood type golf clubs having a higher number than the driver. These heads can be made of a fiber reinforced resin or metal by compression molding, injection molding or a similar process. Further, the head may have a hollow structure. In this case, the head can be made larger and the moment of inertia of the head can be increased by forming the lateral surfaces into substantially S-shaped curves.

As apparent from the above description, the outer profile lines of the lateral surfaces near the peripheral edges of the upper surface of the head according to the present invention are substantially streamlined, when viewed in a vertical section substantially streamlined, when viewed in a vertical section substantially perpendicular to the club face extending across the lateral surfaces, can be reduced, and the air resistance against the head body can be reduced and the sole surface extending rearward from the lower edge of the club face of the head body remains substantially in a flat plane.

I claim:

1. A head body of a wood type golf club formed integrally with a neck, comprising: a club face for hitting a golf ball; an upper surface extending rearward in a convex curve from the upper edge of the club face; a sole surface extending rearward on a substantially flat plane from the lower edge of the club face and having a smaller area than said upper surface; and lateral surfaces extending rearward between the upper and sole surfaces from the toe and heel edges of the club face, wherein each lateral surface has an inflection point which defines an upper convex portion of the lateral surface merging with said upper surface and a lower concave portion of the lateral surface merging with the sole surface, and wherein the height from the sole surface to said inflection point of the lateral surfaces is increased from the toe and heel edges of the club face toward the rear end of the head body.

2. A head according to claim 1, wherein the upper and sole surfaces of the head body have a substantially D-shaped profile when viewed from above and below, respectively.

3. A head according to claim 1 or 2, wherein the radius of curvature of the profile of the toe side of the upper surface is between 45 mm and 86 mm at a region of about 20 mm around the contact point between the plane perpendicular to a plane parallel to the club face and the toe side of the upper surface.

* * * * *